(12) United States Patent
Nakashima

(10) Patent No.: US 7,814,434 B2
(45) Date of Patent: Oct. 12, 2010

(54) OPERATION SYSTEM

(75) Inventor: Makoto Nakashima, Nagoya (JP)

(73) Assignee: DENSO CORPORATION, Kariya (JP)

( * ) Notice: Subject to any disclaimer, the term of this patent is extended or adjusted under 35 U.S.C. 154(b) by 649 days.

(21) Appl. No.: 11/700,855

(22) Filed: Feb. 1, 2007

(65) Prior Publication Data

US 2007/0186190 A1 Aug. 9, 2007

(30) Foreign Application Priority Data

Feb. 6, 2006 (JP) .............................. 2006-028842

(51) Int. Cl.
*G06F 3/00* (2006.01)
(52) U.S. Cl. .................. 715/811; 715/821; 715/817; 715/835; 715/738
(58) Field of Classification Search ................ 715/811, 715/821, 817, 835, 738
See application file for complete search history.

(56) References Cited

U.S. PATENT DOCUMENTS

| | | | | |
|---|---|---|---|---|
| 5,694,563 | A * | 12/1997 | Belfiore et al. ............... | 715/821 |
| 5,852,440 | A * | 12/1998 | Grossman et al. ............ | 715/811 |
| 6,823,344 | B1 * | 11/2004 | Isensee et al. ............ | 707/104.1 |
| 6,847,387 | B2 * | 1/2005 | Roth ............................ | 715/811 |
| 6,876,969 | B2 * | 4/2005 | Nakao .......................... | 704/260 |
| 6,938,216 | B1 * | 8/2005 | Ishisaki ....................... | 715/817 |
| 7,216,301 | B2 * | 5/2007 | Moehrle ...................... | 715/811 |
| 7,315,613 | B2 * | 1/2008 | Kleindienst et al. ....... | 379/88.13 |
| 7,340,686 | B2 * | 3/2008 | Matthews et al. ............ | 715/779 |
| 2002/0149623 | A1 * | 10/2002 | West et al. ................... | 345/765 |
| 2005/0004953 | A1 | 1/2005 | Kurase | |
| 2005/0076309 | A1 * | 4/2005 | Goldsmith ................... | 715/811 |

FOREIGN PATENT DOCUMENTS

| | | |
|---|---|---|
| DE | 199 62 213 | 6/2001 |
| DE | 102 30 854 | 1/2004 |
| JP | A-H05-265682 | 10/1993 |
| JP | A-2002-2416 | 1/2002 |
| JP | A-2004-287702 | 10/2004 |

OTHER PUBLICATIONS

Matthews, Martin S. "Windows XP Professional: A Beginner's Guide." McGraw-Hill, Copyright 2003. 8 pages.*
Office Action mailed Nov. 4, 2009 in corresponding Japanese patent application No. 2006-028842 (and English translation).
Office Action dated Apr. 29, 2009 from German Patent Office in the corresponding DE Application No. 10 2007 005 640.2 (and English Translation).

* cited by examiner

*Primary Examiner*—Kieu Vu
*Assistant Examiner*—Michael Roswell
(74) *Attorney, Agent, or Firm*—Posz Law Group, PLC

(57) ABSTRACT

In a navigation device, multi-layered menu windows are sequentially displayed in a display unit and narrowed down by repeatedly selecting an item in each menu window to thereby consequently display a certain instruction window for instructing an execution of a function. This selection procedure is stored such that a selection record, which indicates an association with the certain instruction window, is assigned to each of the selected items in the displayed menu windows. When a certain item assigned the selection record is operated more than a predetermined time period, the currently displayed menu window including the certain item is switched to the certain instruction window without intermediate menu windows displayed. Thus, when intending to display the certain instruction window, which was previously displayed after the selection procedure, a user can significantly simplify the selection procedure and decrease workloads.

1 Claim, 4 Drawing Sheets

OPERATION SYSTEM

CROSS REFERENCE TO RELATED APPLICATION

This application is based on and incorporates herein by reference Japanese Patent Application No. 2006-28842 filed on Feb. 6, 2006.

FIELD OF THE INVENTION

The present invention relates to an operation system, in which menu windows are hierarchically displayed.

BACKGROUND OF THE INVENTION

Conventionally, various operation systems have been proposed in which menu windows are multi layered and displayed to facilitate user's input operation. For instance, Patent document 1 discloses an operation system, in which an input operation is received as an operation instruction via an operation panel or operation switches adjacent to the operation panel. The operation instruction causes a corresponding control device to run.

The operation panel includes (i) a mode change switch for switching between a record mode and a record release mode, (ii) an execution switch, (iii) a storage unit, and (iv) a control unit. In the record mode, the control unit stores in the storage unit an operation procedure, in which the operation switches are sequentially operated. In the record release mode, when the execution switch is operated, the control unit serially transmits, to control devices, operation instructions based on the operation procedure stored in the record mode.

In the above system, a user needs to determine whether an operation procedure should be recorded and needs to switch to the record mode via the mode change switch of the operation system when the operation procedure is determined to be recorded.

Further, when a user wants to change an operation procedure to execute another function, the user needs to switch to the record mode again and operate an operation procedure that the user wants to newly record.

Thus, a conventional operation system requires a user to manually operate for recording an operation procedure and also for changing the operation procedure. This does not sufficiently facilitate workloads of the user.

SUMMARY OF THE INVENTION

It is an object of the present invention to provide an operation system to eliminate a user's operation for recording an operation procedure and to simplify a user's operation.

According to an aspect of the present invention, an operation system is provided as follows. A display unit is included for displaying windows including (i) a plurality of instruction windows, each of which is for instructing an execution of a function, and (ii) a plurality of menu windows, which are hierarchical at a plurality of layers and have items individually linked with windows to be displayed when a selection operation is performed for each of the items. An instruction window is displayed by a selection procedure of repeating the selection operation. A storage unit is included for storing as a selection record an association between (i) a certain item included in a certain menu window and selected in a latest selection procedure and (ii) a certain instruction window displayed by the latest selection procedure. A skip instruction unit is included for indicating skipping of displaying at least one menu window previously displayed between the certain menu window and the certain instruction window, while specifying the certain item in the certain menu window with a selection operation. A display control unit is included for skipping the at least one menu window based on the stored selection record when the skip instruction unit indicates the skipping.

This structure focuses attention on a high probability of user's repeatedly selecting a function, which was previously selected. This facilitates a transition to an instruction window for instructing an execution of the function.

When a user intends to select a certain function, which was previously selected or was previously tried to select, the user does not need at least an operation in at least one menu window. This simplifies the user's operation.

In this structure, the user is not required to indicate an instruction for storing or updating a selection procedure in the storage unit.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

A navigation device provided in a vehicle as an example of an embodiment according to an operation system of the present invention will be explained with reference to FIGS. 1 to 5.

Figure 1:
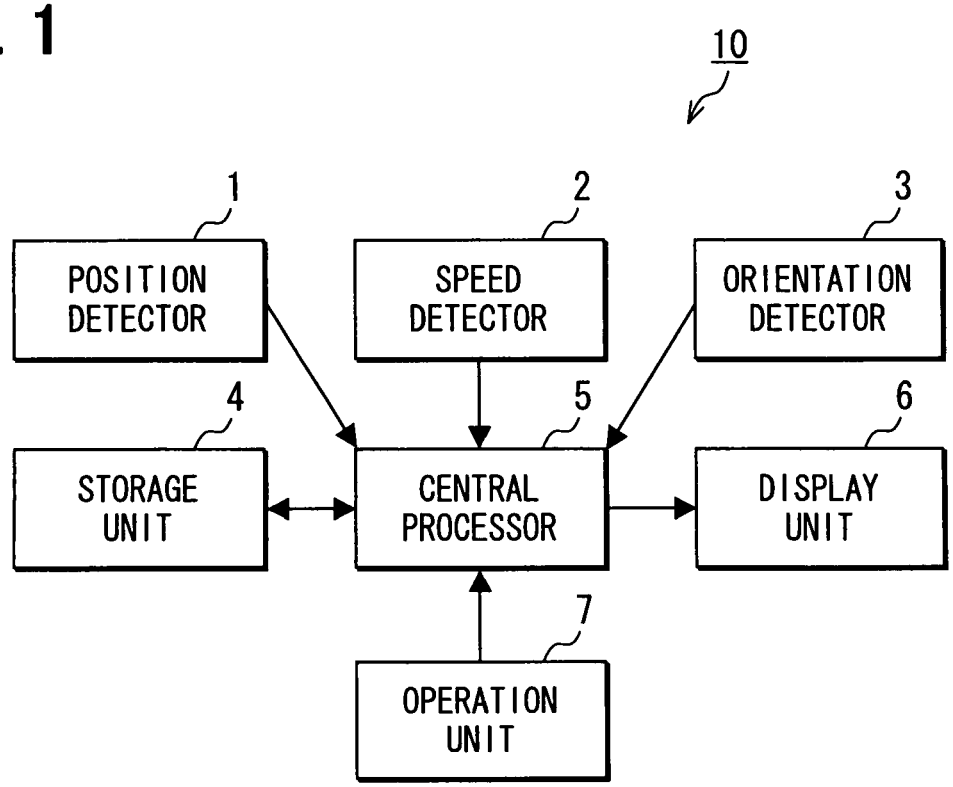
FIG. 1 is a block diagram illustrating an overall structure of a navigation device as an example of an embodiment according to the present invention.

An overall structure of a navigation device 10 is shown in a block diagram in FIG. 1. The navigation device 10 is mounted in a subject vehicle and includes a central processor 5, a position detector 1, a speed detector 2, an orientation detector 3, a storage unit 4, a display unit 6, and an operation unit 7.

The central processor 5 is a known computer including a CPU, ROM, RAM, I/O and a bus line connecting the foregoing. The ROM stores programs for various controls executed in the navigation device 10. The CPU processes based on the programs.

The position detector 1 includes a receiver and antenna for GPS (Global Positioning System), in which a vehicle position is measured based on radio waves from satellites. The position detector 1 periodically transmits data on a position of the subject vehicle to the central processor 5.

The speed detector 2 includes a pick-up coil and a rotor rotating according to a vehicle speed to detect the vehicle speed. Data on the detected vehicle speed is transmitted to the central processor 5. The orientation detector 3 includes a known geomagnetic sensor and gyroscope to detect a vehicle's orientation (i.e., heading direction) as an absolute or relative orientation. Data on the detected vehicle orientation is transmitted to the central processor 5.

The storage unit 4 is provided with a storage medium such as CD-ROM, DVD-ROM, or HDD to store map rendering data for rendering maps and facility data for retrieving facilities. Facility data include, with respect to each facility, a name, a category, an address, a phone number, a postal code, coordinates, etc.

The display unit 6 includes, e.g., a liquid crystal display. The display unit 6 displays, in its screen, various windows such as an operation window for a user to operate one of various functions in the navigation device 10, and a map display window for displaying maps. A map display window includes (i) a vehicle position mark for indicating a current position and heading direction of the subject vehicle and (ii) a map generated from the map rendering data in the storage unit 4 to surround the vehicle's current position.

The operation unit 7 may be touch-sensitive switches integrated in the display unit 6 or mechanical switches, used for various inputs such as map scrolling, character input, or menu item selection.

The navigation device 10 has a destination retrieval function, a route guide function, a traffic information provision function, a setting function, and the like. In the destination retrieval function, a destination is retrieved based on a name, address, phone number, or the like. In the route guide function, an optimum route is retrieved from a starting point to the retrieved destination and a user is guided along the route by displaying the route or by guiding with voices. In the traffic information provision function, information on a congestion, road repairing, etc. is displayed. In the setting function, various settings such as screen settings in the display unit 6 are set or specified.

For instance, in the above functions, menu windows, which include selection items in menus, are sequentially displayed for a user to select items by following instructions in the windows or necessary information may be inputted by the user; thereby, a certain function preferred by the user is performed under an optional condition. In other words, the menu windows are hierarchically provided (at multiple layers) for a user to easily recognize and operate. For instance, when a certain item is selected (through a selection operation) in a higher layered menu window, a lower layered menu window corresponding to the selected certain item appears in the screen such that the higher layered menu window is replaced with the lower layered menu window. As a result, an instruction window appears after repeatedly and sequentially performing the selection operations (i.e., selection procedure). The instruction window is used as an operation window for instructing an execution of a target function.

Figure 2:
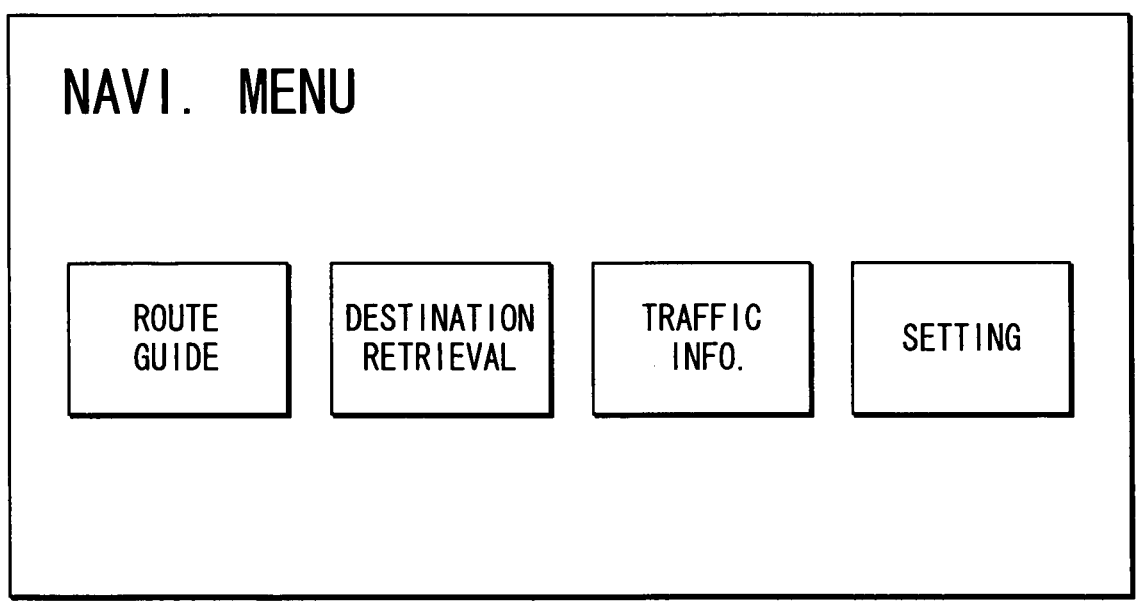
FIG. 2 is a view of an example of a menu window at the highest layer.

For instance, an example of a menu window at the highest layer is illustrated in FIG. 2. The operation system of the example is applied to a navigation system mounted in a vehicle. The highest layered menu window includes major divisions (selection items) of various functions performed in the navigation device 10. A certain selection item of the selection items in FIG. 2 is selected to thereby display a lower layered menu window, which is lower in the layers by one layer than the menu window in FIG. 2 and corresponds to (or is linked with) the selected certain selection item. A corresponding instruction window appears as the result from repeating such selection operations. This instruction window may mean an operation window, via which a user instructs the navigation device 10 to perform a function selected through the selection procedure, or a function under a condition specified by selection and/or input through the selection procedure. Specifying a condition by selection and/or input is mainly performed in the instruction window rather than in the menu windows. However, part or whole of specifying a condition may be performed in the menu windows, which precede the instruction window.

For instance, in the menu window in FIG. 2, when a destination retrieval item is selected, a next layered menu window (i.e., a one-layer-lowered menu window) appears to include multiple selection items such as a name, a category, an address, a postal code, and a phone number for indicating methods for retrieving a destination. When "name" is selected from the selection items in the next layered menu window, an alphabetical input window appears as an instruction window for a user to input a target name using alphabetical keys. In this case, an execution condition for executing a function is inputted and specified in the instruction window of the alphabetical input window.

In contrast, when "address" is selected from the selection items, an additional menu window appears to indicate selection items for selecting prefectures (or states, i.e., the highest layered divisions in an address system in a corresponding nation). Then, when a certain prefecture is selected, a menu window further appears to indicate, as selection items, cities (or counties, i.e., the second-highest layered divisions in the address system in the corresponding nation) included in the selected certain prefecture. Subsequently, lower layered divisions (i.e., towns, streets, house numbers) are sequentially indicated in subsequent menu windows to consequently specify the target address. Then, when an instruction switch is operated to display a map corresponding to the specified address, the map is displayed. On this map, the target address or destination is consequently specified. In this case, an operation window used for the user to specify and determine the destination on the displayed map corresponds to an instruction window for instructing an execution of a function. Further, selection for specifying an execution condition is made also in the menu windows, where addresses are narrowed down.

As explained above, in the destination retrieval function, multiple selection items are provided to indicate methods for retrieving a destination, and each section item further undergoes multiple selections or inputs of conditions to narrow down destinations. Thus, multiple menu windows may be provided frequently at multiple layers. In a conventional method, even when a destination, which was previously retrieved, is retrieved again, a user is required to repeatedly operate an identical selection or input operation, which was operated previously. This cannot facilitate a user's workload.

In contrast, the navigation device 10 stores or records the selection procedure previously undergone. Namely, when a certain instruction window is displayed by repeatedly selecting items in menu windows provided at multiple layers, an association of the certain instruction window with each of the items selected in the multiple menu windows is stored as a selection record in the storage unit 4. In other words, each of the items selected in the multiple menu windows is assigned a selection record, which indicates an association with the certain instruction window. Further, the association of the certain instruction window is updated each time the latest selection procedure is undergone. Further, suppose that a certain menu window includes a certain selection item, which has a selection record with or an association with the certain instruction window in the latest selection procedure. In this case, when the certain selection item is operated or selected through a selection operation continuing more than a predetermined time period, the certain instruction window directly appears without displaying another intermediate menu window, which was displayed between the certain menu window and the certain instruction window in the latest selection procedure. Thus, when displaying an instruction window, which was previously reached and displayed after a certain selection procedure, user's operation can be significantly simplified from the certain selection procedure.

Figure 3:
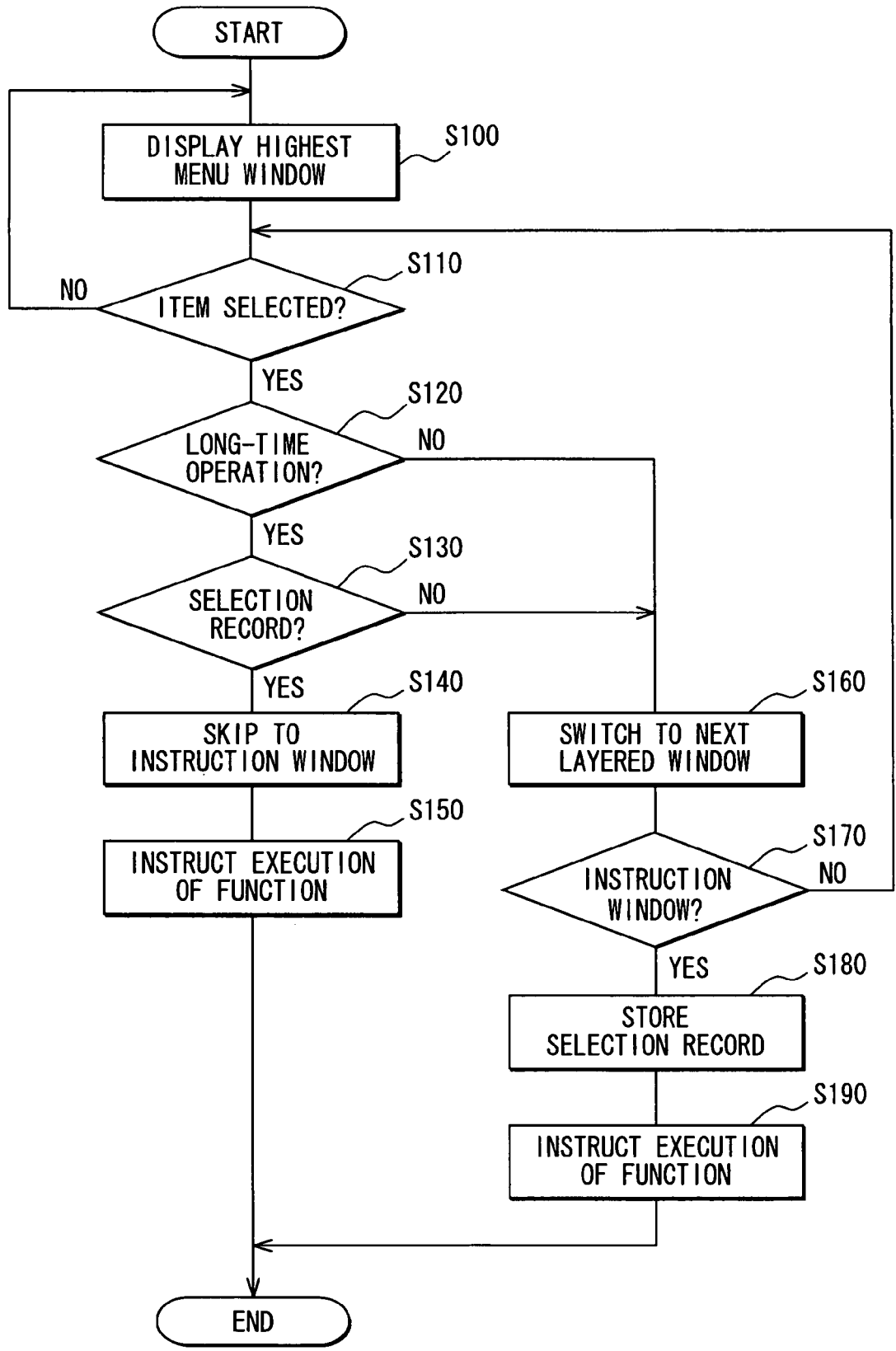
FIG. 3 is a flowchart diagram illustrating a display process.

Next, a display process for displaying menu windows in the navigation device 10 will be explained with reference to FIGS. 3 and 4.

At Step S100, the highest layered menu window exemplified in FIG. 2 is displayed. At Step S110, it is determined whether a target item is selected by a user in the highest layered menu window. A selection operation to select a target item displayed on a menu window is performed by touching the target item when a touch-sensitive panel is used or by locating a cursor to the target item and pressing a determination switch when a switch on an panel is used.

When the determination at Step S110 is affirmed, the sequence goes to Step S120. At Step S120, it is determined whether the selection operation is a long-time operation, which is continued more than a predetermined time period. In this example, when the selection operation applied to a certain target item is not continued more than the predetermined time period, it is regarded as a usual selection operation, which is only used for selecting the certain target item. In contrast, when the selection operation is determined to be a long-time operation, it is regarded as a skip instruction operation, which is used for directly reaching or displaying a corresponding instruction window, which was previously reached though selecting the certain target item.

Thus, when the determination at Step S120 is affirmed, the sequence goes to Step S130, where it is determined whether the certain selection item is assigned a selection record, which indicates an association with an instruction window.

How to store a selection record will be explained with reference to FIG. 4. FIG. 4 illustrates a hierarchical structure of menu windows and related instruction windows. The first layered (i.e., highest layered) menu window includes, as selection items, major divisions A, B, and C. In particular, FIG. 4 illustrates a hierarchical structure under the major division A.

The second latest selection procedure is illustrated as follows: the major division A was selected in the first layered menu window; a selection item A1 was selected in a second layered menu window; a selection item A12 was selected in a third layered menu window; a selection item A122 was selected in a fourth layered menu window; and an instruction window for A122 is consequently displayed. After this second latest section procedure to reach the instruction window for A122 was undergone, a selection record A122 is assigned to each selection item A, A1, A12, and A122 to indicate an association with the instruction window for A122.

Next, the (first) latest selection procedure is illustrated as follows: the major division A was also selected in the first layered menu window; a selection item A2 was selected in a second layered menu window; a selection item A22 was selected in a third layered menu window; a selection item A222 was selected in a fourth layered menu window; and an instruction window for A222 is consequently displayed. After this first latest selection procedure to reach the instruction window for A222 was undergone, a selection record A222 is assigned to each selection item A, A2, A22, and A222 to indicate an association with the instruction window for A222. Namely, with respect to the selection item A in the first layered menu window, the selection record A222 is substituted for the selection record A122 as the result of updating by the latest selection procedure.

When it is determined that the certain selection item is assigned a selection record at Step S130, the sequence goes to Step S140. At Step S140, a corresponding instruction window, which is associated with the certain selection item in the selection record, is directly displayed without displaying other intermediate menu windows at layers lower than the menu window including the certain selection item. This eliminates user's workload in selection operations necessary for selecting the other intermediated menu windows.

Figure 4:
FIG. 4 is a diagram explaining a display process in a hierarchical structure.
Figure 4:
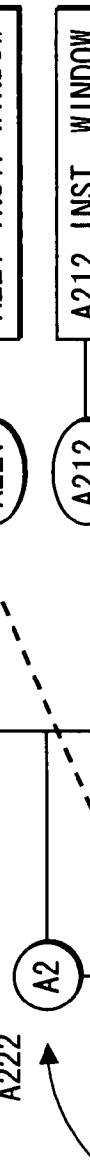
Figure 4:
Figure 4:
Figure 4:

In the example in FIG. 4, when a long-time selection operation is determined to be applied to the selection item A in the first layer, the selection item A2 in the second layer, or the selection item A22 in the third layer, the instruction window for A222 is directly displayed without any additional menu window displayed. Further, when a long-time selection operation is determined to be applied to the selection item A1 in the second layer, or the selection item A12 in the third layer, the instruction window for A122 is directly displayed without any additional menu window displayed.

As explained with respect to the selection item A, a selection record with respect to each selection item is updated to replace an older selection record, which was previously assigned and stored, with a newer selection record, which is newly assigned. In other words, the selection record with respect to each selection item is maintained effective until the new selection record is assigned. This results from consideration of a high probability of user's repeatedly selecting an identical function; further, this facilitates a transition to an instruction window for performing the function previously selected. Thus, a user's workload can be effectively simplified in the selection procedure. Further, as explained with respect to the selection item A1 in the second layered menu window, the selection record stored after the second latest undergone selection procedure is maintained, so that a user can also simplify the selection operations for reaching the relatively frequently selected function.

At Step S150, in the instruction window, an input process or an execution process is performed based on an instruction by the user. In the input process, an execution condition for executing a function is specified. In the execution process, an instruction is made or outputted to execute a target function.

In contrast, when the determination at Step S120 or Step S130 is negated, the sequence goes to Step S160. At Step S160, the displayed window is switched to the next layered window.

At Step S170, it is determined whether the current displayed window is an instruction window or not. When the determination at Step S170 is negated, the sequence returns to Step S110. When the determination at Step S170 is affirmed, the sequence goes to Step S180. Here, a new selection record is assigned to each selection item selected in the selection procedure to be associated with the current instruction window and stored. Then, at Step S190, similarly to Step S150, in the instruction window, an input process or an execution process is performed based on an instruction by the user.

MODIFICATIONS

In the above example, a selection record is assigned to selection items selected in all the menu windows of all layers to reach an instruction window; however, the selection record may be assigned to selection items selected in at least one menu window at one layer.

In the above example, when a selection operation is determined to be a long-time operation, the displayed window is switched from the currently displayed menu window directly to a corresponding instruction window without displaying any intermediate menu window between the currently displayed menu window and the instruction window. However, it can be designed that the displayed window skips at least one of the intermediate menu windows.

In the above example, a long-time operation, which is continued more than a predetermined time period, is used as a skip instruction means to skip intermediate menu windows. This need not prepare an additional switch dedicated for the purpose. However, a single purpose switch may be provided such that a user operates the single purpose switch to execute a skip instruction operation.

In the above example, when an instruction window for instructing an execution of a certain function is displayed, a selection record is assigned to corresponding selection items regardless of whether an instruction for executing the certain function is actually made or not.

However, it may be differently designed such that the selection record is assigned only when the instruction for executing the certain function is actually made. This prevents the latest selection record from being updated when the instruction for executing the certain function is stopped although the instruction window appears.

Further, when information is inputted in an instruction window and further maybe in a menu window, the input information may be stored in addition to the selection record. This stored input information can be reflected on the instruction window when the intermediate menu windows are skipped by the skip instruction means. This can eliminate repeated input operations of the previously input information when the input information can be also used as a condition for executing the certain function.

Further, in this case, whether the previous input information is allowed to be reflected as it is may be queried to the user. This is because the user may intend to execute the certain function in a condition different from that in the previous instruction. It may be designed to allow the user to previously select whether the stored input information is reflected on the instruction window by previously switching between a reflection mode and a non-reflection mode. Namely, when the reflection mode is selected, the stored input information is reflected simultaneously when the instruction window appears. Further, a switch between a reflection mode and a non-reflection mode may be additionally provided when the instruction window appears.

Figure 5:
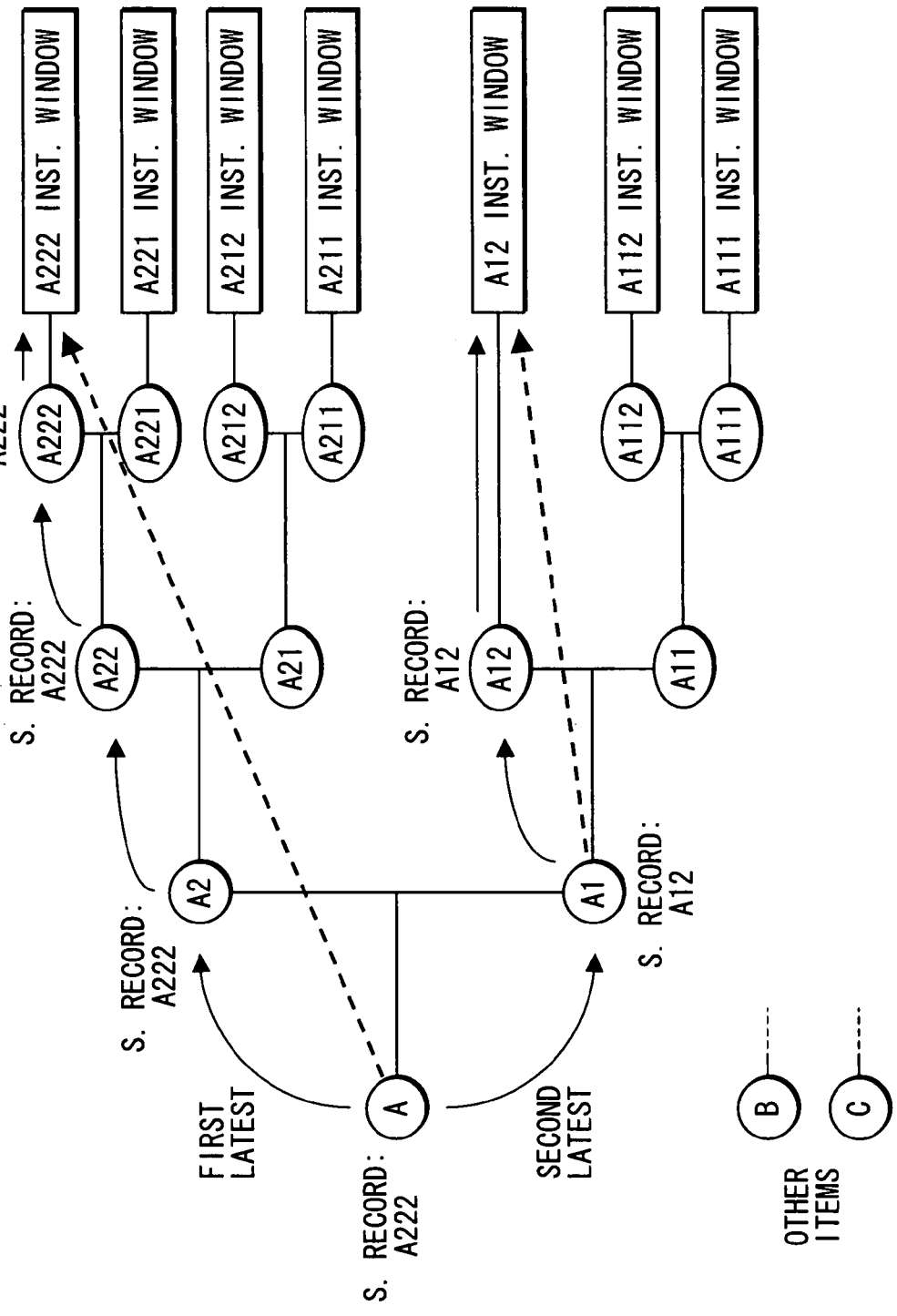
FIG. 5 is a diagram explaining a display process in another hierarchical structure.

Further, in the above example, a hierarchical structure of menu windows and instruction windows is illustrated in FIG. 4. However, another hierarchical structure is also illustrated in FIG. 5. Here, the instruction window for A12 is provided under a third layered menu window A12 without an intermediate fourth layered menu window. It means that an instruction window is not always provided under the lowest layer (fourth layer).

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. An operation system, comprising:
   a hardware display unit for displaying windows including
      (i) a plurality of instruction windows, each instruction window used for instructing an execution of a function, and
      (ii) a plurality of hierarchical menu windows, each menu window containing items, each item respectively linked with a hierarchically lower window, which is displayed when a selection operation is performed for the each item, the plurality of hierarchical menu windows including
         (a) a single first menu window, which is hierarchically highest,
         (b) a plurality of intermediate menu windows hierarchically lower than the first menu window, and
         (c) a plurality of last menu windows hierarchically lower than the intermediate menu windows, each last menu window directly linked with one of the instruction windows hierarchically lowest, wherein one of the instruction windows is displayed by a selection procedure of repeating selection operations taking place in menu windows from the first menu window up to one of the last menu windows;
   a storage unit configured to store as a selection record of a latest selection procedure with respect to a certain item of items in a certain menu window of the plurality of menu windows an association between (i) the certain item in the certain menu window and (ii) a certain instruction window displayed by the latest selection procedure;
   a skip instruction unit configured to indicate skipping of displaying at least one lower-layered menu window while specifying one of items in any one of the first menu window and the intermediate menu windows, the any one of the first menu window and the intermediate menu windows being displayed by the display unit; and
   a display control unit configured to skip the at least one lower-layered menu window towards one of the instruction windows based on the stored selection record when the skip instruction unit indicates the skipping while specifying the one of items in the any one of the first menu window and the intermediate menu windows, wherein
      the skip instruction unit indicates the skipping by continuing the selection operation for the certain item more than a predetermined time period.

* * * * *